(12) United States Patent
Kim et al.

(10) Patent No.: US 12,377,759 B2
(45) Date of Patent: Aug. 5, 2025

(54) SEAT RAIL FOR VEHICLE

(71) Applicants: Hyundai Motor Company, Seoul (KR); Kia Corporation, Seoul (KR); Hyundai Transys Inc., Seosan-si (KR); NIFCO Korea Inc., Asan-si (KR)

(72) Inventors: Eun Sue Kim, Hwaseong-si (KR); Jung Sang You, Hwaseong-si (KR); Myung Hoe Kim, Seoul (KR); Dae Hee Lee, Incheon (KR); Ki Young Yun, Suwon-si (KR); Chan Ju Kim, Gunpo-si (KR); Eom Seok Yoo, Hwaseong-si (KR); Gyong Min Kim, Hwaseong-si (KR); Jin Wook Choi, Hwaseong-si (KR); Geun Heung Kim, Osan-si (KR); In Gul Baek, Hwaseong-si (KR)

(73) Assignees: HYUNDAI MOTOR COMPANY, Seoul (KR); KIA CORPORATION, Seoul (KR); HYUNDAI TRANSYS INC., Seosan-si (KR); NIFCO KOREA INC., Asan-si (KR)

( * ) Notice: Subject to any disclaimer, the term of this patent is extended or adjusted under 35 U.S.C. 154(b) by 326 days.

(21) Appl. No.: 17/978,563

(22) Filed: Nov. 1, 2022

(65) Prior Publication Data
US 2023/0373357 A1    Nov. 23, 2023

(30) Foreign Application Priority Data
May 19, 2022    (KR) .......................... 10-2022-0061527

(51) Int. Cl.
*B60N 2/07*    (2006.01)

(52) U.S. Cl.
CPC ............. *B60N 2/07* (2013.01); *B60N 2/0725* (2013.01)

(58) Field of Classification Search
CPC ....... B60N 2/07; B60N 2/0722; B60N 2/0725
See application file for complete search history.

(56) References Cited

U.S. PATENT DOCUMENTS

| | | | |
|---|---|---|---|
| 2022/0134911 A1* | 5/2022 | Kim | B60N 2/072 248/429 |
| 2022/0161703 A1* | 5/2022 | Jo | B62D 65/14 |

(Continued)

FOREIGN PATENT DOCUMENTS

| | | |
|---|---|---|
| KR | 101046608 B1 | 7/2011 |
| KR | 20120004206 A | 1/2012 |

OTHER PUBLICATIONS

Translation of JP 2001-1800 (Year: 2001).*

*Primary Examiner* — Gregory A Blankenship
(74) *Attorney, Agent, or Firm* — SLATER MATSIL, LLP (57) ABSTRACT

An embodiment seat rail for a vehicle includes a fixed rail having a rail slit therein, the rail slit being extended in a longitudinal direction of the vehicle, a moving rail having a lower end inserted into the fixed rail through the rail slit, the moving rail being movable in the longitudinal direction along the rail slit, and a front screen or a rear screen covering the rail slit and connecting a front end of the fixed rail to the moving rail or a rear end of the fixed rail to the moving rail, respectively, wherein the front screen or the rear screen is configured to perform a winding operation or a releasing operation when the moving rail moves, the winding operation being performed by elasticity of the front screen or the rear screen.

19 Claims, 6 Drawing Sheets

(56) References Cited

U.S. PATENT DOCUMENTS

| | | | |
|---|---|---|---|
| 2022/0348119 A1* | 11/2022 | Touzet | B60N 2/0725 |
| 2023/0373357 A1* | 11/2023 | Kim | B60N 2/07 |
| 2023/0415616 A1* | 12/2023 | Katsube | B60N 2/0725 |

* cited by examiner

SEAT RAIL FOR VEHICLE

CROSS-REFERENCE TO RELATED APPLICATIONS

This application claims the benefit of Korean Patent Application No. 10-2022-0061527, filed on May 19, 2022, which application is hereby incorporated herein by reference.

TECHNICAL FIELD

The present invention relates to a seat rail for a vehicle.

BACKGROUND

In general, a seat of a vehicle is installed to slide forward and rearward along a seat rail.

A basic structure of the seat rail includes a fixed rail fixed to a floor panel while extending in a longitudinal direction and a moving rail coupled to the fixed rail to move in the longitudinal direction along the fixed rail and coupled to the seat of a vehicle.

A seat of a vehicle with the moving rail moving by a motor is a power seat or an electric seat, and the power seat may include a plurality of gears (pinion gear, rack gear, etc.) in the fixed rail to allow the moving rail to move.

Meanwhile, the fixed rail has a slit-shaped gap in a longitudinal direction of a vehicle, and the moving rail is inserted into the fixed rail through the gap to move in the longitudinal direction along the fixed rail. Therefore, there is a problem caused by foreign materials entering the fixed rail through the gap between the fixed rail and the moving rail.

Specifically, a seat rail applied to a seat in a second row or a third row of a sport utility vehicle (SUV) or a multi-purpose vehicle (MPV) is a long rail that is longer than a seat rail of a general passenger vehicle. As a gap section in the long rail is longer than the seat rail of the general passenger vehicle, the amount of foreign matter entering the fixed rail is further increased.

The foregoing is intended merely to aid in the understanding of the background of embodiments of the present invention, and is not intended to mean that the present invention falls within the purview of the related art that is already known to those skilled in the art.

SUMMARY

The present invention relates to a seat rail for a vehicle. Particular embodiments relate to a seat rail for a vehicle, the seat rail being configured to cover a gap between a fixed rail and a moving rail of the structure of an electric power long rail to prevent foreign materials from entering the fixed rail.

Embodiments of the present invention provide a seat rail for a vehicle, the seat rail being configured to cover a gap between a fixed rail and a moving rail to fundamentally prevent foreign materials from entering the fixed rail, and improve the durability and the merchantability of the vehicle.

Another embodiments of the present invention prevents exposure of the inside space of a seat rail for a vehicle by covering a gap between a fixed rail and a moving rail to improve the aesthetic of the exterior appearance.

In order to achieve features of embodiments of the invention, according to one embodiment of the present invention, there is provided a seat rail for a vehicle, the seat rail including a fixed rail having a rail slit therein, the rail slit being extended in a longitudinal direction of the vehicle, a moving rail of which a lower end may be inserted into the fixed rail through the rail slit and configured to move in the longitudinal direction along the rail slit, and a front screen or a rear screen provided to connect a front end of the fixed rail to the moving rail or a rear end of the fixed rail to the moving rail and covering the rail slit, wherein the front screen or the rear screen may perform a winding operation or a releasing operation when the moving rail moves, and the winding operation may be performed by elasticity of the front screen or the rear screen.

The front screen and the rear screen may be made of a steel spiral spring with the same spring force in entire parts with heat treatment.

A front drum may be rotatably provided at the front end of the fixed rail, and the front screen may have a first end fixed to and wound on the front drum and a second end coupled to a front portion of the moving rail.

The front drum may be rotatably coupled to a front drum housing, and the front drum housing may be coupled to the front end of the fixed rail in a separable hook structure.

The front drum housing may include a drum shaft integrally formed therein, and the front drum may be rotatably coupled to the drum shaft inside the front drum housing.

A rear drum may be rotatably provided at the rear end of the fixed rail, and the rear screen may have a first end fixed to and wound on the rear drum and a second end coupled to a rear portion of the moving rail.

The rear drum may be rotatably coupled to a rear drum housing, and the rear drum housing may be coupled to the rear end of the fixed rail in a separable hook structure.

The rear drum housing may include a drum shaft integrally formed therein, and the rear drum may be rotatably coupled to the drum shaft inside the rear drum housing.

When the moving rail moves forward, the front screen may be wound on the front drum by an elastic restoring force thereof and the rear screen may be released from the rear drum, the front screen wound on the front drum may be configured to pull the moving rail forward by an elastic force thereof and the rear screen released from the rear drum may be configured to pull the moving rail rearward by an elastic force thereof, and the elastic force of the front screen pulling the moving rail forward and the elastic force of the rear screen pulling the moving rail rearward may be equal to each other.

When the moving rail moves rearward, the front screen may be released from the front drum and the rear screen may be wound on the rear drum by an elastic restoring force thereof, the front screen released from the front drum may be configured to pull the moving rail forward by an elastic force thereof and the rear screen wound on the rear drum may be configured to pull the moving rail rearward by an elastic force thereof, and the elastic force of the front screen pulling the moving rail forward and the elastic force of the rear screen pulling the moving rail rearward are equal to each other.

The seat rail for a vehicle may include an inner cover coupled to the fixed rail and located above the fixed rail and an outer cover coupled to the fixed rail and located above the inner cover, wherein the front screen and the rear screen may be provided to be located between the inner cover and the outer cover.

According to another embodiment of the present invention, there is provided a seat rail for a vehicle, the seat rail including a front drum and a rear drum rotatably coupled to opposite ends of a fixed rail, respectively, and a front screen connecting the front drum to a moving rail and a rear screen connecting the rear drum to the moving rail, wherein when the moving rail moves, the front screen and the rear screen may be released from the drums or are wound on the drums by elastic restoring forces thereof, respectively, and the front screen and the rear screen may cover a rail slit corresponding to a gap between the fixed rail and the moving rail.

According to embodiments of the present invention, the seat rail for a vehicle is configured such that when the moving rail moves, the front screen and the rear screen are wound on or released from the front drum and the rear drum by elasticity thereof, respectively, and the front screen and the rear screen cover portions of the rail slit to the front and rear of the moving rail. Therefore, it is possible to prevent foreign materials from entering the fixed rail and to reduce the number of parts and manufacturing costs.

Furthermore, according to embodiments of the present invention, the seat rail for a vehicle is configured to cover the rail slit using the front screen and the rear screen to prevent the inside space of the fixed rail from being exposed outward. Therefore, the aesthetic of the exterior appearance can be improved.

DETAILED DESCRIPTION OF ILLUSTRATIVE EMBODIMENTS

Hereinbelow, preferred embodiments of the present invention will be described in detail with reference to the accompanying drawings. The same reference numerals will be used throughout the drawings and the description to refer to the same or like elements or parts, and the overlapped description of those elements will be omitted.

The suffixes "module" and "part" for the elements used in the following description are given or mixed in consideration of only the ease of writing the specification, and do not have distinct meanings or roles by themselves.

In the following description, it is to be noted that, when the functions of conventional elements and the detailed description of elements related with embodiments of the present invention may make the gist of the present invention unclear, a detailed description of those elements will be omitted.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

Furthermore, a unit or a control unit included in the name of a motor control unit (MCU), a hybrid control unit (HCU), etc. is only a term widely used in the naming of a controller controlling a specific vehicle function, and does not mean a universal functional unit.

The controller may include a communication device communicating with other controllers or sensors to control functions thereof, a memory storing operating system or logic commands, input/output information, etc., and at least one processor performing determinations, calculations, decisions, etc. necessary to control the functions thereof.

Hereinbelow, a seat rail for a vehicle according to an exemplary embodiment of the present invention will be described with reference to the accompanying drawings.

According to embodiments of the present invention, as shown in FIGS. 1 to 6, a seat rail for a vehicle includes a fixed rail 100 having a rail slit no therein, the rail slit no being extended in a longitudinal direction of the vehicle, a moving rail 200 of which a lower end is inserted into the fixed rail 100 through the rail slit no and configured to move in the longitudinal direction along the rail slit no, a front screen 300 provided to connect a front end of the fixed rail 100 to the moving rail 200 and covering a portion of the rail slit no at the front side of the moving rail 200, and a rear screen 400 provided to connect a rear end of the fixed rail 100 to the moving rail 200 and covering a portion of the rail slit no at the rear side of the moving rail 200.

Figure 1:
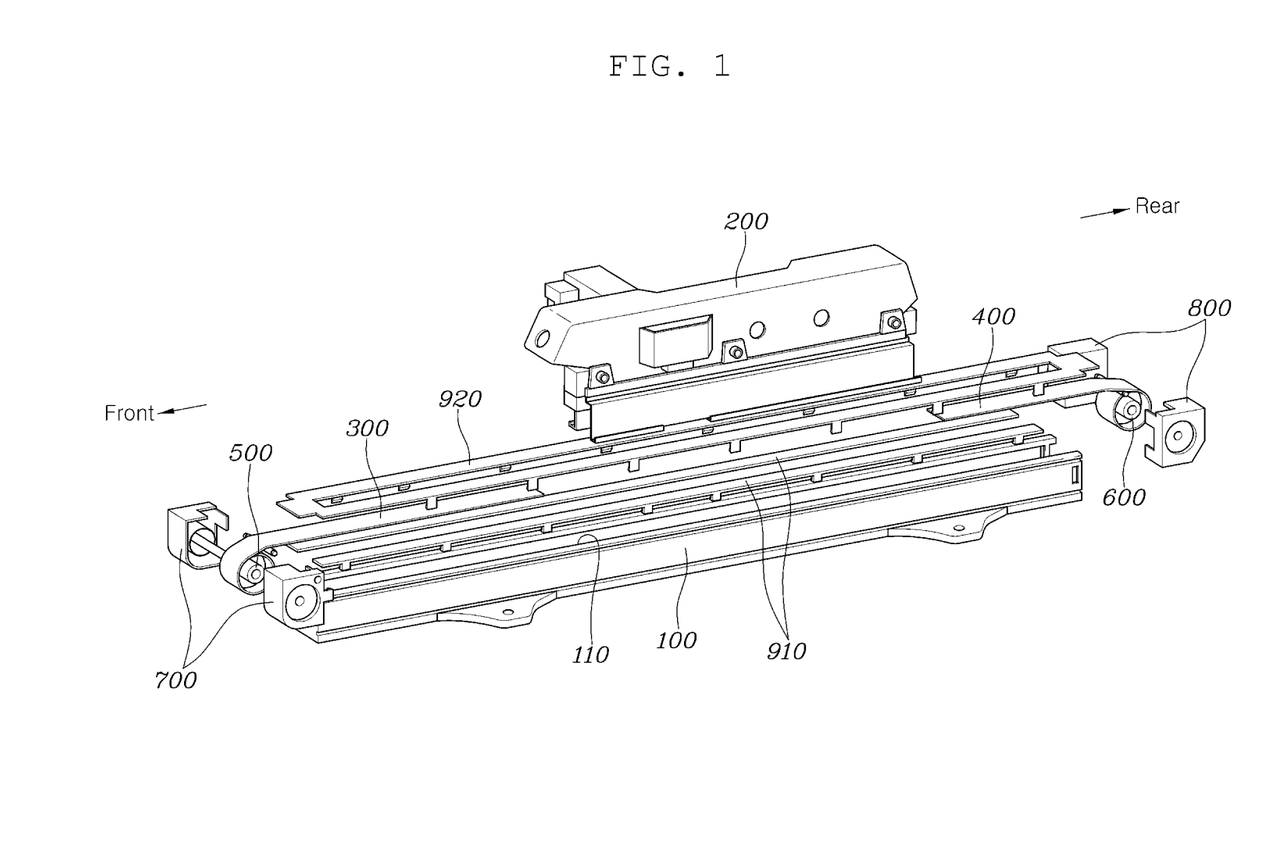
FIG. 1 is an exploded-perspective view showing a seat rail for a vehicle according to embodiments of the present invention.
Figure 2:
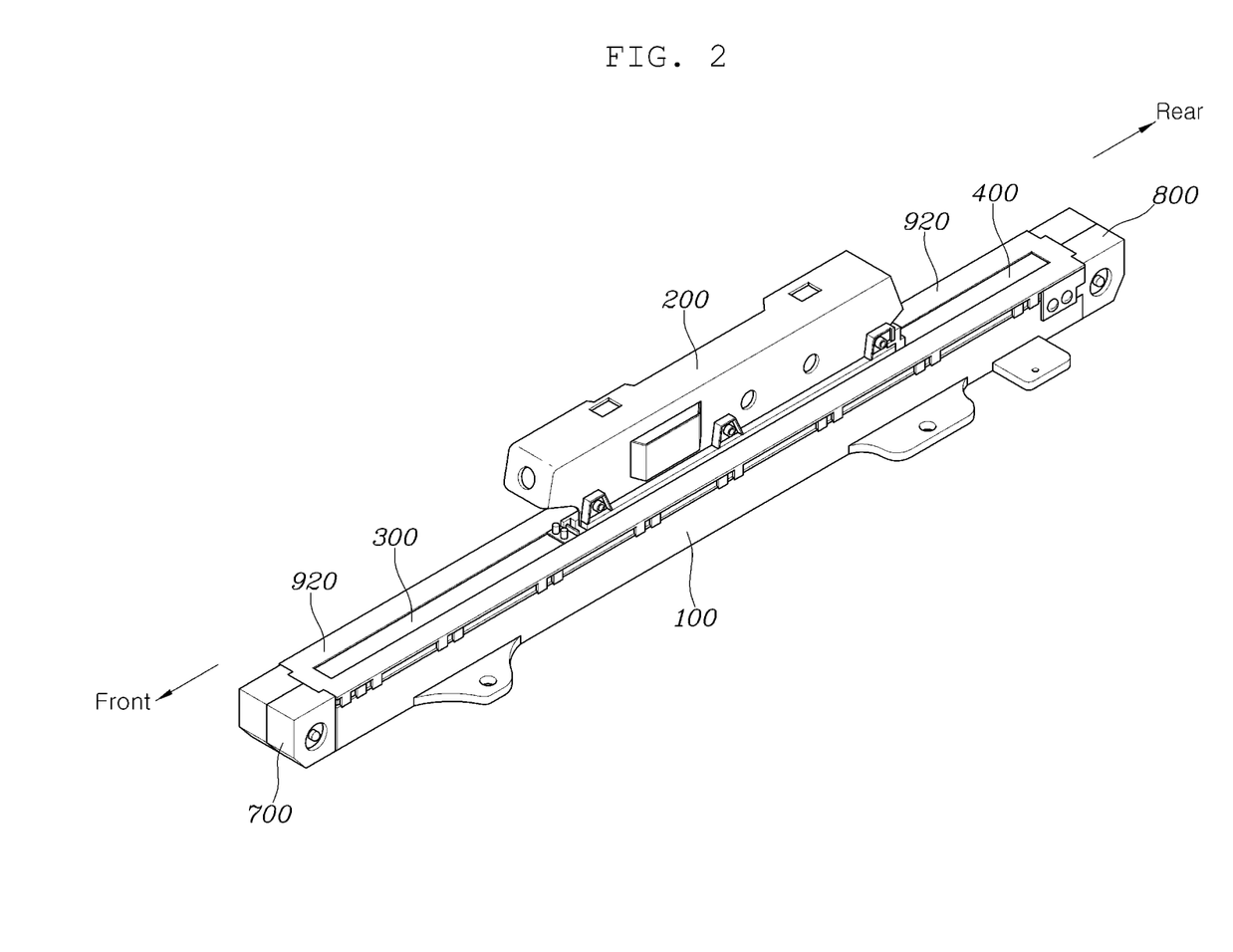
FIG. 2 is an assembled state of FIG. 1.

The fixed rail 100 is arranged in a longitudinal direction of the vehicle and securely installed to a floor panel.

The fixed rail 100 has the rail slit no having an upper opening and extended in the longitudinal direction, the lower end of the moving rail 200 is inserted into the fixed rail 100 through the rail slit no, and an upper end of the moving rail 200 protrudes toward the upper side of the fixed rail 100 to be connectively coupled to a vehicle seat.

When the moving rail 200 moves, the front screen 300 and the rear screen 400 perform a winding operation and a releasing operation, and the winding operation is performed by elasticity of the front screen 300 and the rear screen 400.

For the above structure, the front screen 300 and the rear screen 400 are made of a steel material in which heat treatment is performed to supply the elasticity and are spiral springs having the spring force of the same property in entire parts with the heat treatment.

The spiral spring is called a one surface spiral spring, a constant torque spring, a constant force spring, or the like.

A front drum 500 is rotatably provided at the front end of the fixed rail 100 to perform the winding operation and the releasing operation of the front screen 300 and the rear screen 400, and a rear drum 600 is rotatably provided at the rear end of the fixed rail 100.

A first end (front end) of the front screen 300 is fixed to and wound on the front drum 500 and a second end (rear end) thereof is securely coupled to a front portion of the moving rail 200.

Figure 3:
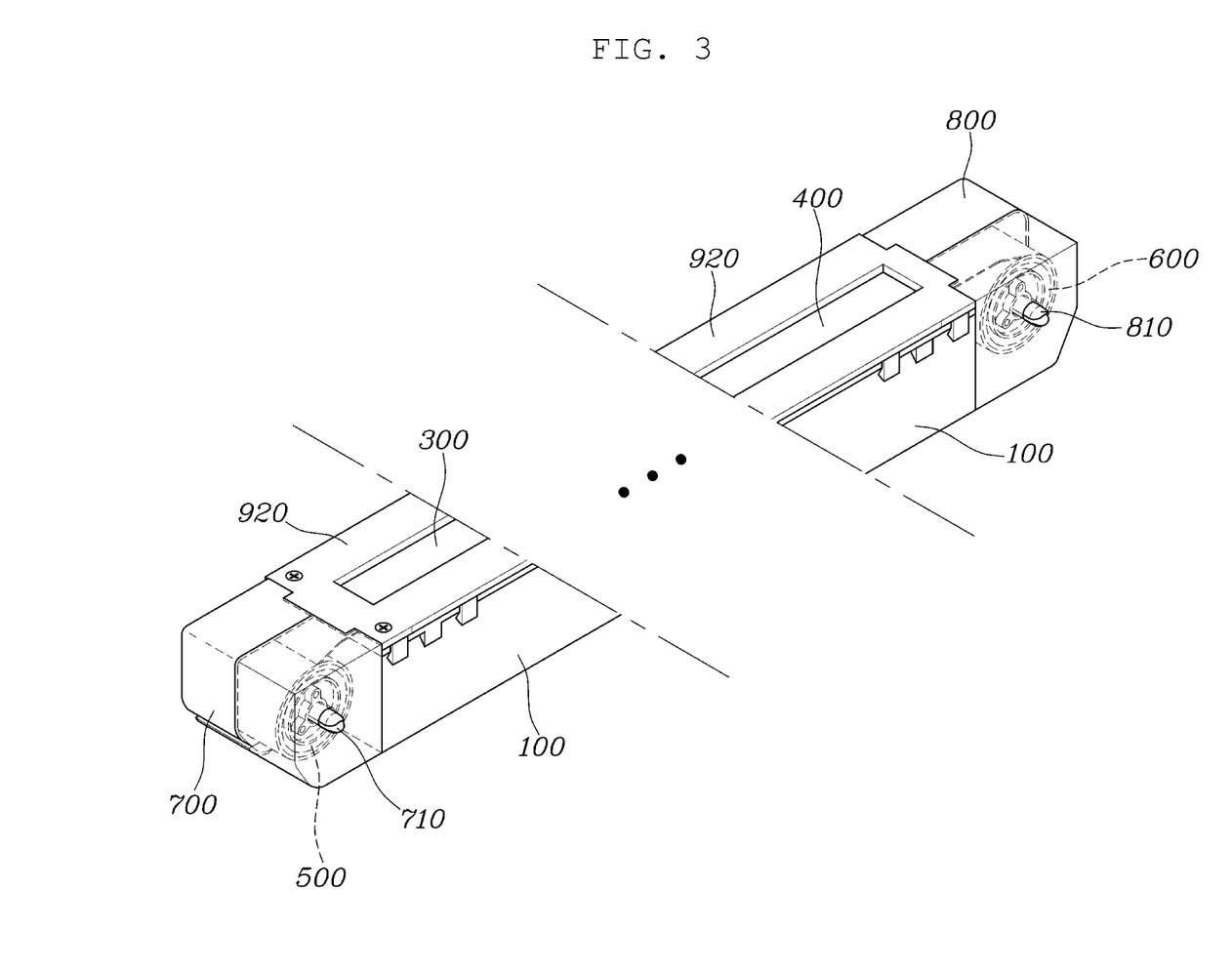
FIGS. 3 to 5 are views showing a portion where a front drum and a rear drum are coupled to each other in FIG. 2.
Figure 4:
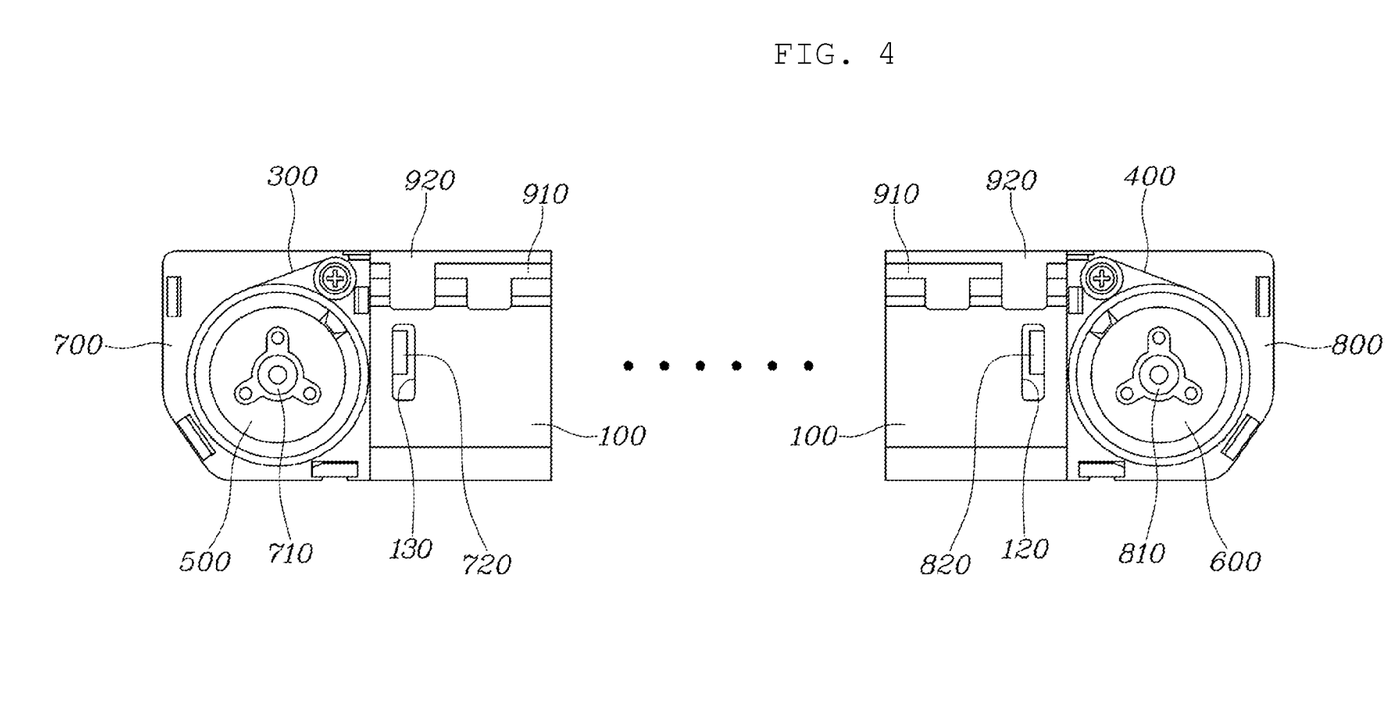
Figure 5:
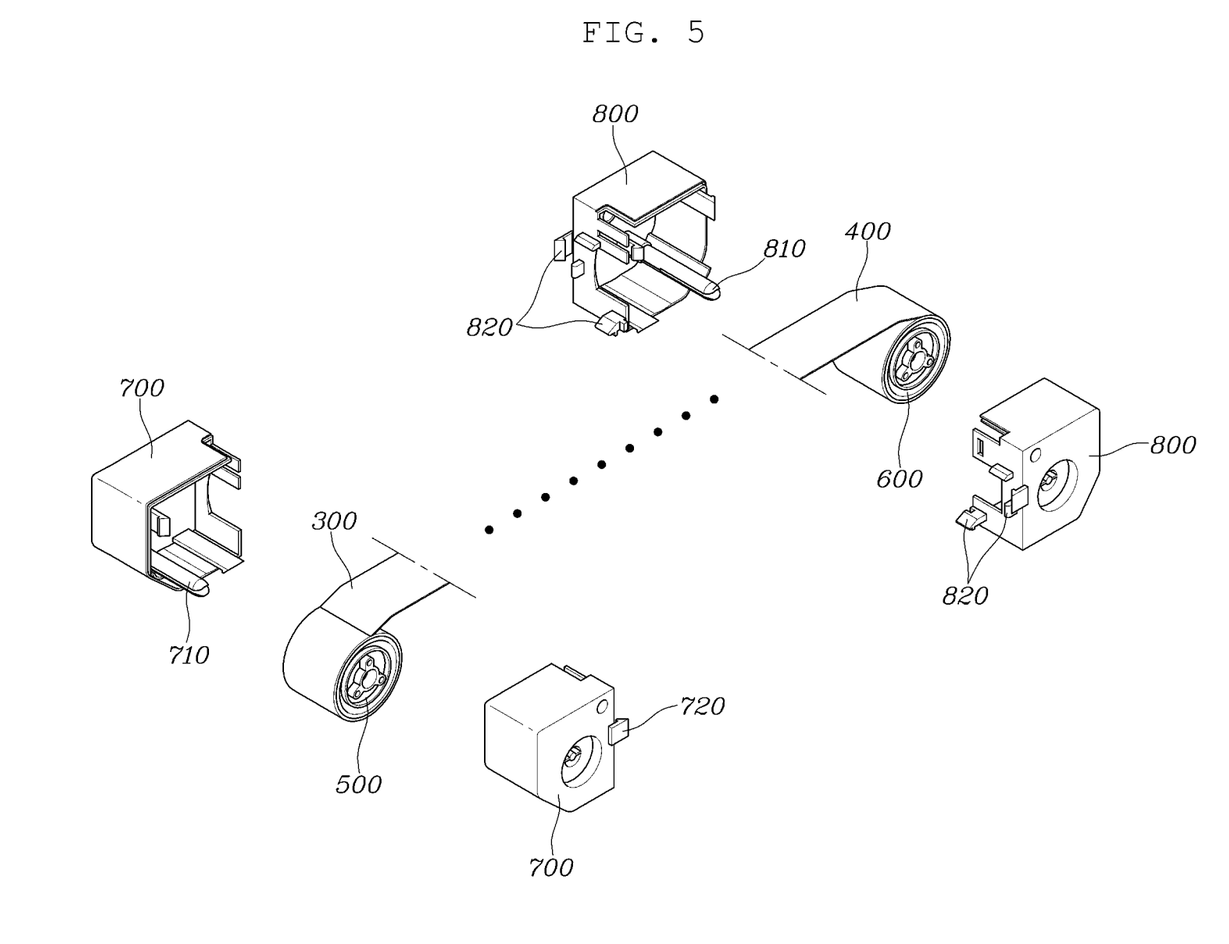

The front drum 500 is rotatably coupled to the front drum housing 700, and a front drum housing 700 is coupled to the front end of the fixed rail 100 in a separable hook structure.

A drum shaft 710 is integrally formed with the front drum housing 700, and the front drum 500 is rotatably coupled to the drum shaft 710 inside the front drum housing 700.

The front drum housing 700 has a structure in which a left housing and a right housing are separably coupled to each other, and the drum shaft 710 is integrally formed with the front drum housing 700 and the front drum 500 is coupled to the drum shaft 710 in a rotatable structure.

A conventional structure has a separate part corresponding to a drum shaft assembled to a drum housing by an assembly member such as a bolt or a screw as a medium, causing problems in that the number of parts and manufacturing costs increase.

On the other hand, according to the embodiments of the present invention, the seat rail has the structure in which the drum shaft 710 is integrally formed with the front drum housing 700, and comparing the conventional structure having the separate drum shaft, there are advantages in that the number of parts and manufacturing costs are reduced.

Furthermore, the conventional structure includes the drum housing with a drum, the drum housing being assembled to a rail member by an assembly member such as a bolt or a screw as a medium, causing a problem in that the number of parts and manufacturing costs increase.

On the other hand, according to the embodiments of the present invention, a hook 720 is integrally provided with the front drum housing 700 and a hook hole 130 into which the hook 720 is coupled is formed in the fixed rail 100. Accordingly, the front drum housing 700 is coupled to the front end of the fixed rail 100 as the hook 720 is coupled to the hook hole 130, causing advantages in that the number of parts and manufacturing costs are reduced.

A first end (rear end) of the rear screen 400 is fixed to and wound on the rear drum 600 and a second end (front end) thereof is securely coupled to a rear portion of the moving rail 200.

The rear drum 600 is rotatably coupled to a rear drum housing 800, and the rear drum housing 800 is coupled to the rear end of the fixed rail 100 in a separable hook structure.

A drum shaft 810 is integrally formed with the rear drum housing 800, and the rear drum 600 is rotatably coupled to the drum shaft 810 inside the rear drum housing 800.

The rear drum housing 800 has a structure in which a left housing and a right housing are separably coupled to each other, and the drum shaft 810 is integrally formed with the rear drum housing 800 and the rear drum 600 is coupled to the drum shaft 810 in a rotatable structure.

A conventional structure has a separate part corresponding to the drum shaft assembled to the drum housing by the assembly member such as a bolt or a screw as a medium, causing problems in that the number of parts and manufacturing costs increase.

On the other hand, according to the embodiments of the present invention, the seat rail has the structure in which the drum shaft 810 is integrally formed with the rear drum housing 800, and comparing the conventional structure having the separate drum shaft, there are advantages in that the number of parts and manufacturing costs are reduced.

Furthermore, the conventional structure includes the drum housing with the drum, the drum housing being assembled to a rail member by an assembly member such as a bolt or a screw as a medium, causing a problem in that the number of parts and manufacturing costs increase.

On the other hand, according to the embodiments of the present invention, a hook 820 is integrally provided with the rear drum housing 800 and a hook hole 120 into which the hook 820 is coupled is formed in the fixed rail 100. Accordingly, the rear drum housing 800 is coupled to the rear end of the fixed rail 100 as the hook 720 is coupled to the hook hole 130, so that the number of parts and manufacturing costs are reduced.

According to the embodiments of the present invention, when the moving rail 200 moves forward, the front screen 300 is wound on the front drum 500 by an elastic restoring force thereof, and the rear screen 400 at the opposite side is released from the rear drum 600.

The winding operation of the front screen 300 and the releasing operation of the rear screen 400 are achieved by rotation of the front drum 500 and the rotation of the rear drum 600.

The front screen 300 wound on the front drum 500 pulls the moving rail 200 forward by an elastic force thereof, and the rear screen 400 released from the rear drum 600 pulls the moving rail 200 rearward by an elastic force thereof.

Herein, the elastic force of the front screen 300 pulling the moving rail 200 forward is equal to the elastic force of the rear screen 400 pulling the moving rail 200 rearward. Accordingly, the front screen 300 and the rear screen 400 are held in a taut state without loosely sagging down.

Furthermore, according to the embodiments of the present invention, when the moving rail 200 moves rearward, the front screen 300 is released from the front drum 500, and the rear screen 400 at the opposite side is wound on the rear drum 600 by an elastic restoring force thereof.

The releasing operation of the front screen 300 and the winding operation of the rear screen 400 are achieved by the rotation of the front drum 500 and the rotation of the rear drum 600.

The front screen 300 released from the front drum 500 pulls the moving rail 200 forward by the elastic force, and the rear screen 400 wound on the rear drum 600 pulls the moving rail 200 rearward by the elastic force.

Herein, the elastic force of the front screen 300 pulling the moving rail 200 forward is equal to the elastic force of the rear screen 400 pulling the moving rail 200 rearward. Accordingly, the front screen 300 and the rear screen 400 are held in a taut state without loosely sagging down.

Figure 6:
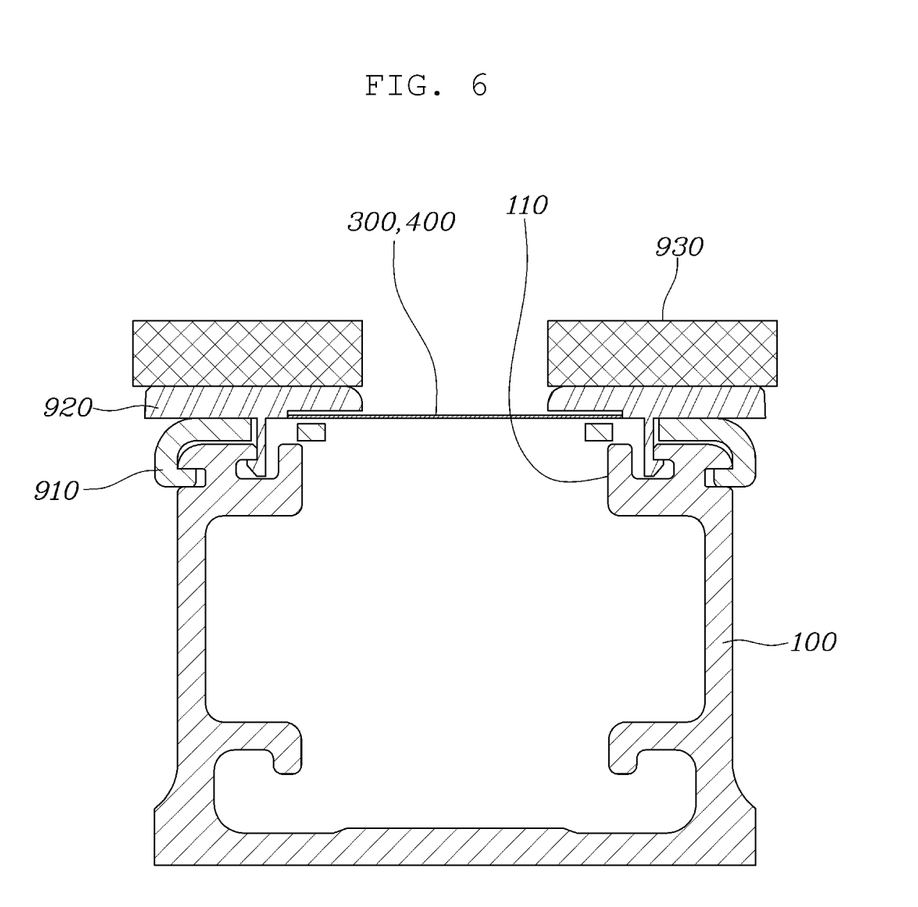
FIG. 6 is a sectional view showing an inner cover and an outer cover coupled to a fixed rail according to embodiments of the present invention.

The seat rail according to embodiments of the present invention includes an inner cover 910 coupled to the fixed rail 100 and located above the fixed rail 100 and an outer cover 920 coupled to the fixed rail 100 and located above the inner cover 910. The front screen 300 and the rear screen 400 are installed between the inner cover 910 and the outer cover 920.

The inner cover 910 and the outer cover 920 serve to cover the upper portion of the fixed rail 100. Furthermore, the front screen 300 and the rear screen 400 are located between the inner cover 910 and the outer cover 920 so that movements of the front screen 300 and the rear screen 400 are guided by the inner cover 910 and the outer cover 920.

As shown in FIG. 6, a carpet 930 is covered on the outer cover 920.

According to the embodiments of the present invention, the seat rail for a vehicle is configured to cover the rail slit no by the front screen 300 and the rear screen 400 of the spiral spring structure having the elasticity. Therefore, there are advantages in that the number of parts and manufacturing costs are reduced.

Furthermore, the front screen 300 and the rear screen 400 having a property of the constant torque spring may allow the operation of the moving rail 200 by applying a constant force in forward and rearward directions of the moving rail 200 not to deviate from the rail.

According to embodiments of the present invention, the front screen 300 and the rear screen 400 are respectively coupled to the front and rear portions of the moving rail 200, and the front screen 300 and the rear screen 400 are respectively wound on the front drum 500 and the rear drum 600 coupled to the inside portion of the front drum housing 700 and the inside portion of the rear drum housing 800 located at the front and rear portions of the fixed rail 100.

The front screen 300 and the rear screen 400 are spiral springs having the elasticity, and the front screen 300 and the rear screen 400 are characterized in that the first ends thereof are respectively fixed to and remain to be wound on the front drum 500 and the rear drum 600.

With the characteristic, when the moving rail 200 moves, the screen located at the front side in the moving direction is wound on the drum while being restored itself, and the screen located at the rear side in the moving direction is pulled and released from the drum thus being unwound.

The screen wound on the drum by the restoring force thereof applies a force pulling the moving rail 200 in the moving direction, and the screen released from the drum applies a force pulling the moving rail 200 in a direction opposite to the moving direction.

Accordingly, the moving rail 200 may move without receiving a resistance force due to the inner cover 910 and the outer cover 920, and the front screen 300 and the rear screen 400 may perform the winding operation without having separate spring members that are provided to wind the screens on the drums.

The conventional structure requires a separate spring member such as a torsion spring to wind the screen member on the drum. However, according to the embodiments of the present invention, the front screen 300 and the rear screen 400 are respectively wound on the front drum 500 and the rear drum 600 by the elastic force of the front screen 300 and the rear screen 400, so that there are advantages in that the number of parts and manufacturing costs can be reduced.

According to embodiments of the present invention, the front screen 300 and the rear screen 400 are respectively located at the front and rear portions of the moving rail 200 and serve to cover the rail slit 110 of the fixed rail 100 to prevent foreign materials from entering the fixed rail 100.

Furthermore, the front screen 300 and the rear screen 400 cover the rail slit no to prevent the inside space of the fixed rail 100 from being exposed outward, so that the aesthetic of the exterior appearance is improved.

The seat rail according to embodiments of the present invention includes the front drum 500 and the rear drum 600 that are rotatably coupled to opposite ends of the fixed rail 100, respectively, and the front screen 300 connecting the front drum 500 to the moving rail 200 and the rear screen 400 connecting the rear drum 600 and the moving rail 200.

The seat rail according to embodiments of the present invention is characterized in that when the moving rail 200 moves, the front screen 300 and the rear screen 400 are released from the drums or are wound on the drums by the elastic restoring force thereof, and the front screen 300 and the rear screen 400 cover the rail slit no corresponding to a gap between the fixed rail 100 and the moving rail 200.

As described above, the seat rail according to embodiments of the present invention is configured such that when the moving rail 200 moves, the front screen 300 and the rear screen 400 are wound on or released from the front drum 500 and the rear drum 600 by elasticity thereof, and the front screen 300 and the rear screen 400 cover the portions of the rail slit no to the front and rear of the moving rail 200. Therefore, it is possible to prevent foreign materials from entering the fixed rail 100 and to reduce the number of parts and manufacturing costs.

Furthermore, according to embodiments of the present invention, the seat rail is configured to cover the rail slit no using the front screen 300 and the rear screen 400 to prevent the inside space of the fixed rail 100 from being exposed outward, so that the aesthetic of the exterior appearance of the vehicle can be improved.

Although the preferred embodiments of the present invention have been disclosed in detail only with respect to the above specific embodiments, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. A seat rail for a vehicle, the seat rail comprising:
    a fixed rail having a rail slit therein, the rail slit being extended in a longitudinal direction of the vehicle;
    a moving rail having a lower end inserted into the fixed rail through the rail slit, the moving rail being movable in the longitudinal direction along the rail slit;
    a front screen or a rear screen covering the rail slit and connecting a front end of the fixed rail to the moving rail or a rear end of the fixed rail to the moving rail, respectively, wherein the front screen or the rear screen is configured to perform a winding operation or a releasing operation when the moving rail moves, the winding operation being performed by elasticity of the front screen or the rear screen,
    an inner cover coupled to the fixed rail and located above the fixed rail; and
    an outer cover coupled to the fixed rail and located above the inner cover, wherein the front screen or the rear screen is located between the inner cover and the outer cover.

2. The seat rail of claim 1, wherein the front screen or the rear screen comprises a steel spiral spring having a same spring force in its entirety with heat treatment.

3. The seat rail of claim 1, wherein:
    the seat rail comprises the front screen;
    a front drum is rotatably provided at the front end of the fixed rail; and
    the front screen has a first end fixed to and wound on the front drum and a second end coupled to a front portion of the moving rail.

4. The seat rail of claim 3, wherein:
    the front drum is rotatably coupled to a front drum housing; and
    the front drum housing is coupled to the front end of the fixed rail in a separable hook structure.

5. The seat rail of claim 4, wherein:
the front drum housing comprises a drum shaft integrally formed therein; and
the front drum is rotatably coupled to the drum shaft inside the front drum housing.

6. The seat rail of claim 3, wherein:
the seat rail further comprises the rear screen;
a rear drum is rotatably provided at the rear end of the fixed rail; and
the rear screen has a first end fixed to and wound on the rear drum and a second end coupled to a rear portion of the moving rail.

7. The seat rail of claim 6, wherein:
the rear drum is rotatably coupled to a rear drum housing; and
the rear drum housing is coupled to the rear end of the fixed rail in a separable hook structure.

8. The seat rail of claim 7, wherein:
the rear drum housing comprises a drum shaft integrally formed therein; and
the rear drum is rotatably coupled to the drum shaft inside the rear drum housing.

9. A seat rail for a vehicle, the seat rail comprising:
a fixed rail having a rail slit therein, the rail slit being extended in a longitudinal direction of the vehicle;
a moving rail having a lower end inserted into the fixed rail through the rail slit, the moving rail being movable in the longitudinal direction along the rail slit;
a front screen or a rear screen covering the rail slit and connecting a front end of the fixed rail to the moving rail or a rear end of the fixed rail to the moving rail, respectively, wherein the front screen or the rear screen is configured to perform a winding operation or a releasing operation when the moving rail moves, the winding operation being performed by elasticity of the front screen or the rear screen,
wherein:
the seat rail comprises the front screen;
a front drum is rotatably provided at the front end of the fixed rail; and
the front screen has a first end fixed to and wound on the front drum and a second end coupled to a front portion of the moving rail,
wherein:
the seat rail further comprises the rear screen;
a rear drum is rotatably provided at the rear end of the fixed rail; and
the rear screen has a first end fixed to and wound on the rear drum and a second end coupled to a rear portion of the moving rail, and
wherein:
when the moving rail moves forward, the front screen is configured to be wound on the front drum by an elastic restoring force thereof and the rear screen is configured to be released from the rear drum;
the front screen wound on the front drum is configured to pull the moving rail forward by an elastic force thereof and the rear screen released from the rear drum is configured to pull the moving rail rearward by an elastic force thereof; and
the elastic force of the front screen pulling the moving rail forward and the elastic force of the rear screen pulling the moving rail rearward are equal to each other.

10. A seat rail for a vehicle, the seat rail comprising:
a fixed rail having a rail slit therein, the rail slit being extended in a longitudinal direction of the vehicle;
a moving rail having a lower end inserted into the fixed rail through the rail slit, the moving rail being movable in the longitudinal direction along the rail slit; and
a front screen or a rear screen covering the rail slit and connecting a front end of the fixed rail to the moving rail or a rear end of the fixed rail to the moving rail, respectively, wherein the front screen or the rear screen is configured to perform a winding operation or a releasing operation when the moving rail moves, the winding operation being performed by elasticity of the front screen or the rear screen,
wherein:
the seat rail comprises the front screen;
a front drum is rotatably provided at the front end of the fixed rail; and
the front screen has a first end fixed to and wound on the front drum and a second end coupled to a front portion of the moving rail,
wherein:
the seat rail further comprises the rear screen;
a rear drum is rotatably provided at the rear end of the fixed rail; and
the rear screen has a first end fixed to and wound on the rear drum and a second end coupled to a rear portion of the moving rail, and
wherein:
when the moving rail moves rearward, the front screen is configured to be released from the front drum and the rear screen is configured to be wound on the rear drum by an elastic restoring force thereof;
the front screen released from the front drum is configured to pull the moving rail forward by an elastic force thereof and the rear screen wound on the rear drum is configured to pull the moving rail rearward by an elastic force thereof; and
the elastic force of the front screen pulling the moving rail forward and the elastic force of the rear screen pulling the moving rail rearward are equal to each other.

11. A seat rail for a vehicle, the seat rail comprising:
a front drum and a rear drum rotatably coupled to opposite ends of a fixed rail, respectively;
a front screen connecting the front drum to a moving rail;
a rear screen connecting the rear drum to the moving rail, wherein the front screen and the rear screen cover a rail slit corresponding to a gap between the fixed rail and the moving rail,
wherein when the moving rail moves, the front screen and the rear screen are configured to be released from the drums or are wound on the drums by elastic restoring forces thereof, respectively;
an inner cover coupled to the fixed rail and located above the fixed rail; and
an outer cover coupled to the fixed rail and located above the inner cover, wherein the front screen or the rear screen is located between the inner cover and the outer cover.

12. A vehicle comprising:
a vehicle body comprising a floor panel;
a fixed rail fixed to the floor panel and extending in a longitudinal direction of the vehicle;
a rail slit provided in the fixed rail and extending in the longitudinal direction of the vehicle;
a moving rail having a lower end inserted into the fixed rail through the rail slit, the moving rail being configured to move in the longitudinal direction along the rail slit;

a front screen covering the rail slit and connecting a front end of the fixed rail to the moving rail;

a rear screen covering the rail slit and connecting a rear end of the fixed rail to the moving rail, wherein the front screen and the rear screen are configured to perform a winding operation and a releasing operation, respectively, based on a movement direction of the moving rail, wherein the winding operation is performable due to elasticity of the front screen and the rear screen;

an inner cover coupled to the fixed rail and located above the fixed rail; and an outer cover coupled to the fixed rail and located above the inner cover, wherein the front screen or the rear screen is located between the inner cover and the outer cover.

13. The vehicle of claim 12, wherein the front screen and the rear screen each comprise a steel spiral spring having a same spring force in its entirety with heat treatment.

14. The vehicle of claim 12, further comprising a front drum rotatably provided at the front end of the fixed rail, wherein the front screen has a first end fixed to and wound on the front drum and a second end coupled to a front portion of the moving rail.

15. The vehicle of claim 14, wherein:

the front drum is rotatably coupled to a front drum housing; and the front drum housing is coupled to the front end of the fixed rail in a separable hook structure.

16. The vehicle of claim 15, wherein:

the front drum housing comprises a drum shaft integrally formed therein; and the front drum is rotatably coupled to the drum shaft inside the front drum housing.

17. The vehicle of claim 14, further comprising a rear drum rotatably provided at the rear end of the fixed rail, wherein the rear screen has a first end fixed to and wound on the rear drum and a second end coupled to a rear portion of the moving rail.

18. The vehicle of claim 17, wherein:

the rear drum is rotatably coupled to a rear drum housing; and the rear drum housing is coupled to the rear end of the fixed rail in a separable hook structure.

19. The vehicle of claim 18, wherein:

the rear drum housing comprises a drum shaft integrally formed therein; and the rear drum is rotatably coupled to the drum shaft inside the rear drum housing.

\* \* \* \* \*